US006341356B1

(12) United States Patent
Johnson et al.

(10) Patent No.: US 6,341,356 B1
(45) Date of Patent: Jan. 22, 2002

(54) SYSTEM FOR I/O PATH LOAD BALANCING AND FAILURE WHICH CAN BE PORTED TO A PLURALITY OF OPERATING ENVIRONMENTS

(75) Inventors: Richard Harold Johnson, Cupertino; Limei Shaw, San Jose; Cam-Thuy Do, Sunnyvale, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/276,618

(22) Filed: Mar. 25, 1999

(51) Int. Cl.[7] ............................ G06F 9/46; G06F 13/14; G06F 11/00; H04L 29/06; H04L 1/22
(52) U.S. Cl. ............................ 714/4; 714/43; 709/301; 711/203; 711/114
(58) Field of Search .......................... 714/4, 5, 7, 38, 714/40, 43, 44; 709/301, 302, 105; 711/114, 203; 710/37, 17, 38, 74, 63, 72, 3, 111; 370/351

(56) References Cited

U.S. PATENT DOCUMENTS

| 4,589,063 | A | * | 5/1986 | Shah et al. |
| 5,239,649 | A | | 8/1993 | McBride et al. ............ 709/105 |
| 5,442,789 | A | | 8/1995 | Baker et al. ................ 709/105 |
| 5,557,740 | A | | 9/1996 | Johnson et al. ............. 714/38 |
| 5,586,268 | A | * | 12/1996 | Chen et al. |
| 5,623,696 | A | | 4/1997 | Johnson et al. ............ 709/326 |
| 5,680,539 | A | | 10/1997 | Jones ......................... 714/6 |
| 5,768,623 | A | | 6/1998 | Judd et al. .................. 710/37 |
| 5,790,775 | A | | 8/1998 | Marks et al. ................ 714/9 |

FOREIGN PATENT DOCUMENTS

| WO | WO9826553 | 6/1998 | ............. G06F/9/46 |
| WO | WO9828686 | 7/1998 | ............. G06F/9/46 |

OTHER PUBLICATIONS

IBM Technical Disclosure Bulletin: vol. 38, No. 7, Jul. 1995, "Dynamic Load Sharing for Distributed Computer Environment," pp. 511–515.

* cited by examiner

*Primary Examiner*—Gopal C. Ray
(74) *Attorney, Agent, or Firm*—Sawyer Law GroupLLP; Noreen A. Krall

(57) ABSTRACT

A method and system for path management of data processing in an environment which includes a plurality of hosts running multiple operating systems is disclosed. The method and system includes providing a portable path management code and providing a plurality of control modules. Each of the control modules has an area which can only be accessed by the portable path management code. The method and system also include providing an interface to at least one device driver from the portable management code to allow the portable management code to control access to plurality of paths to a plurality of storage subsystems by the at least one device driver. The method and system in accordance with the present invention can provide path load balancing and fail over for a plurality of paths to a plurality of storage subsystems. The path management code is portable and platform independent so that the functionality can be ported easily to each operating system in the multiple system environment.

13 Claims, 6 Drawing Sheets

SYSTEM FOR I/O PATH LOAD BALANCING AND FAILURE WHICH CAN BE PORTED TO A PLURALITY OF OPERATING ENVIRONMENTS

FIELD OF INVENTION

The present invention relates generally to the use of peripheral devices in a computer system and more particularly to a system and method for balancing the loads on channel paths in a multiple host operating system environment.

BACKGROUND OF THE INVENTION

Many, if not most, computer systems provide for linking a host computer operating system to one or more peripheral devices which are used as data storage media. For example, the AIX and OS/2 operating systems made by International Business Machines Corporation of Armonk, N.Y. can interface with several different types of storage devices that have a so-called Small Computer System Interface (SCSI) interface format.

Each SCSI contains input/output (I/O) paths to each of its attached data storage devices. Included among SCSI devices are magnetic tape data storage devices, magnetic disk data storage devices, and optical disk data storage devices. Also included among SCSI devices are medium changer library devices, each of which contains several data storage devices. In medium changer devices, one of the data storage disks at a time can be selected and then engaged with a transparent element within the device for accessing data of a data storage device.

In a typical file server, the storage needs typically exceed the capacity of current hard disks, and thus many file servers use multiple disks to provide the necessary storage capacity. A typical disk drive storage configuration uses a redundant array of inexpensive disks, referred to as a RAID configuration, whereby the drives (data storage devices) are linked together through hardware to form a drive array.

FIG. 1 depicts a conventional data transfer system, generally designated 10. As shown, the conventional system 10 includes a computer 12 with associated operating system 14. The conventional system 10 includes a plurality of computer peripheral device drivers 16, 18, 20 for controlling data storage devices 22, 24, 26, respectively. More particularly, the system includes first, second, and third device drivers 16, 18, 20 for respectively controlling first, second, and third data storage devices 22, 24, 26. It is to be understood that the conventional system 10 can include greater or fewer device drivers. The data storage devices 22, 24, 26 in the array are coordinated with each other and information is allocated between them. In this manner, a number of individual hard disks are combined to create a massive virtual system.

In accordance with principles well-known in the art, each device driver 16, 18, 20 receives data I/O requests from an application running on the operating system 14. Further, each device driver 16, 18, 20 executes each I/O request by issuing an appropriate command sequence to its associated data storage device 22, 24, 26 to cause the device 22, 24, 26 to transfer data in accordance with the I/O request. Thus, each device driver 16, 18, 20 is an intermediary between the operating system 14 and the associated data storage device 22, 24, 26, respectively. Stated differently, each device driver 16, 18, 20 functions as a data transfer controller between the operating system 14 and the associated data storage device 22, 24, 26.

One aspect of a RAID storage system is its ability to account for failures using redundancy. To decrease the possibility of losing data stored in a particular drive, each disk drive in the RAID can have multiple paths connected to it. FIG. 2 depicts a conventional operating system 100 with multiple paths 108 connecting the device driver 102 to the respective data storage devices in the RAID 110. However, the conventional operating system 100 cannot recognize multiple paths to a single device. In this configuration, the conventional operating system 100 operates as though each path is connected to a different device, as opposed to multiple paths connected to a single device. Although conventional solutions to these problems exist, these conventional solutions are typically incorporated directly into the operating system 100. These conventional solutions are platform specific and thus not portable from one operational environment to another. Therefore, these conventional solutions can only be utilized by a single operating system 100.

Today, many enterprises have a multiplicity of host computer systems that either function independently or are connected through a network. It is desirable that each system in the multiple host system environment provide the redundancy associated with multiple paths connected to each disk drive. Each system must therefore be capable of managing the multiple paths for each drive. This capability should be easily provided to each operating system in the multiple system environment.

SUMMARY OF THE INVENTION

The present invention provides a method and system for path management of data processing in an environment which includes a plurality of hosts running on multiple operating systems. The method and system comprises providing a portable path management code and providing a plurality of control modules. Each of the control modules has an area which can only be accessed by the portable path management code. The method and system also comprises providing an interface to at least one device driver from the portable management code to allow the portable management code to control access to plurality of paths to a plurality of storage subsystems by the at least one device driver.

The method and system in accordance with the present invention can provide path load balancing and fail over for a plurality of paths to a plurality of storage subsystems. The path management code is portable and platform independent so that the functionality can be ported easily to each operating system in the multiple system environment.

DETAILED DESCRIPTION OF THE INVENTION

The present invention relates to path management of data processing systems in an environment which can include a plurality of hosts running multiple operating systems. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments.

Thus, the present invention is not intended to be limited to the embodiments shown but is to be accorded the widest scope consistent with the principles and features described herein.

Figure 1:
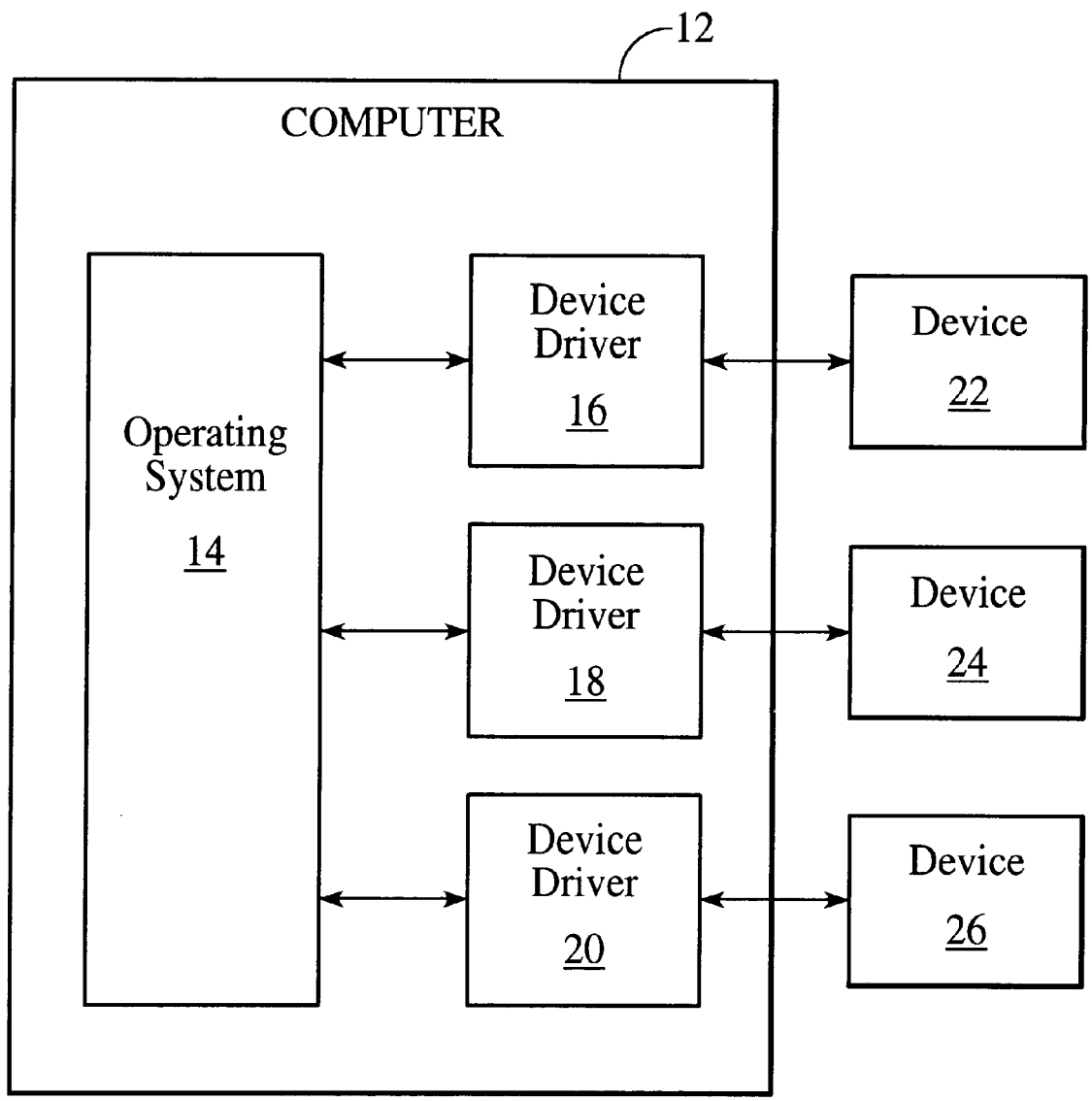
FIG. 1 is a conventional operating system for a device driver.
Figure 2:
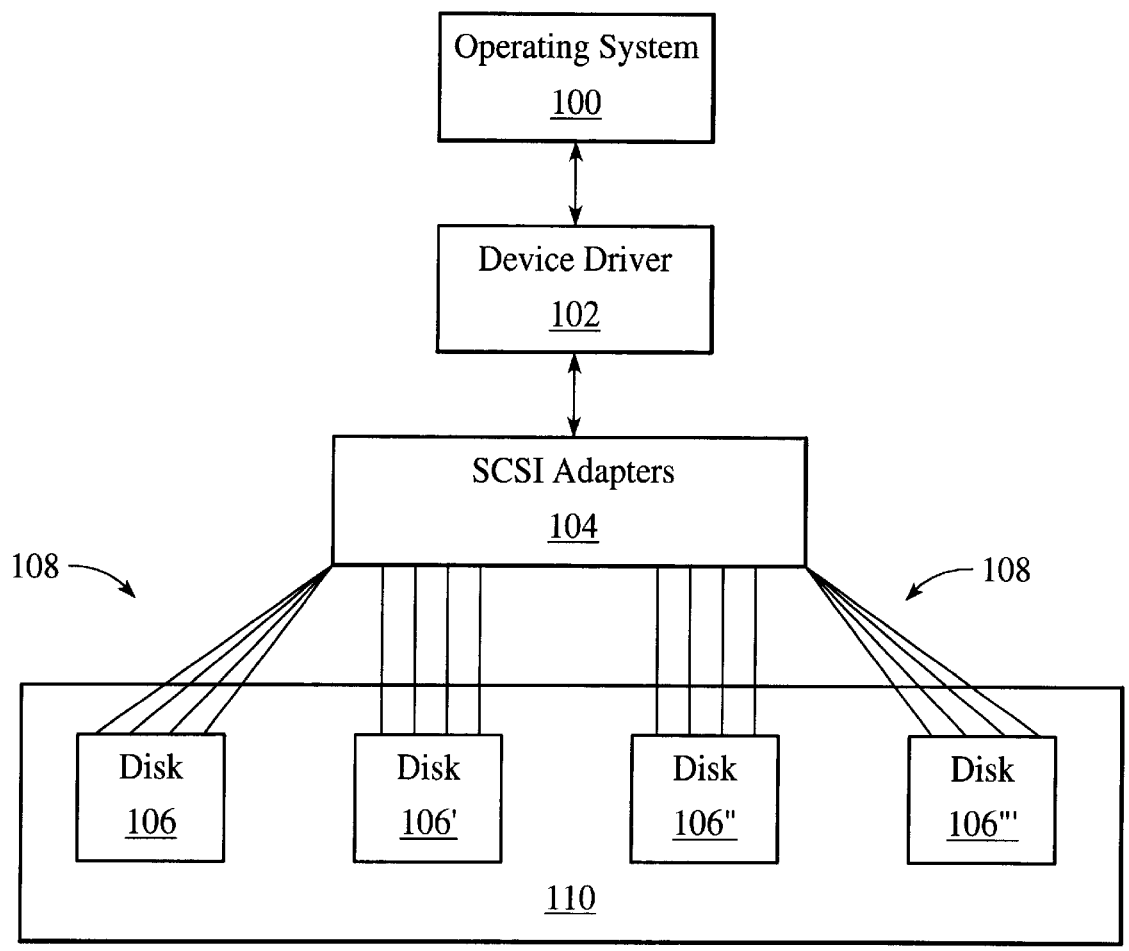
FIG. 2 shows a typical operating system utilizing a multiple path configuration.
Figure 3:
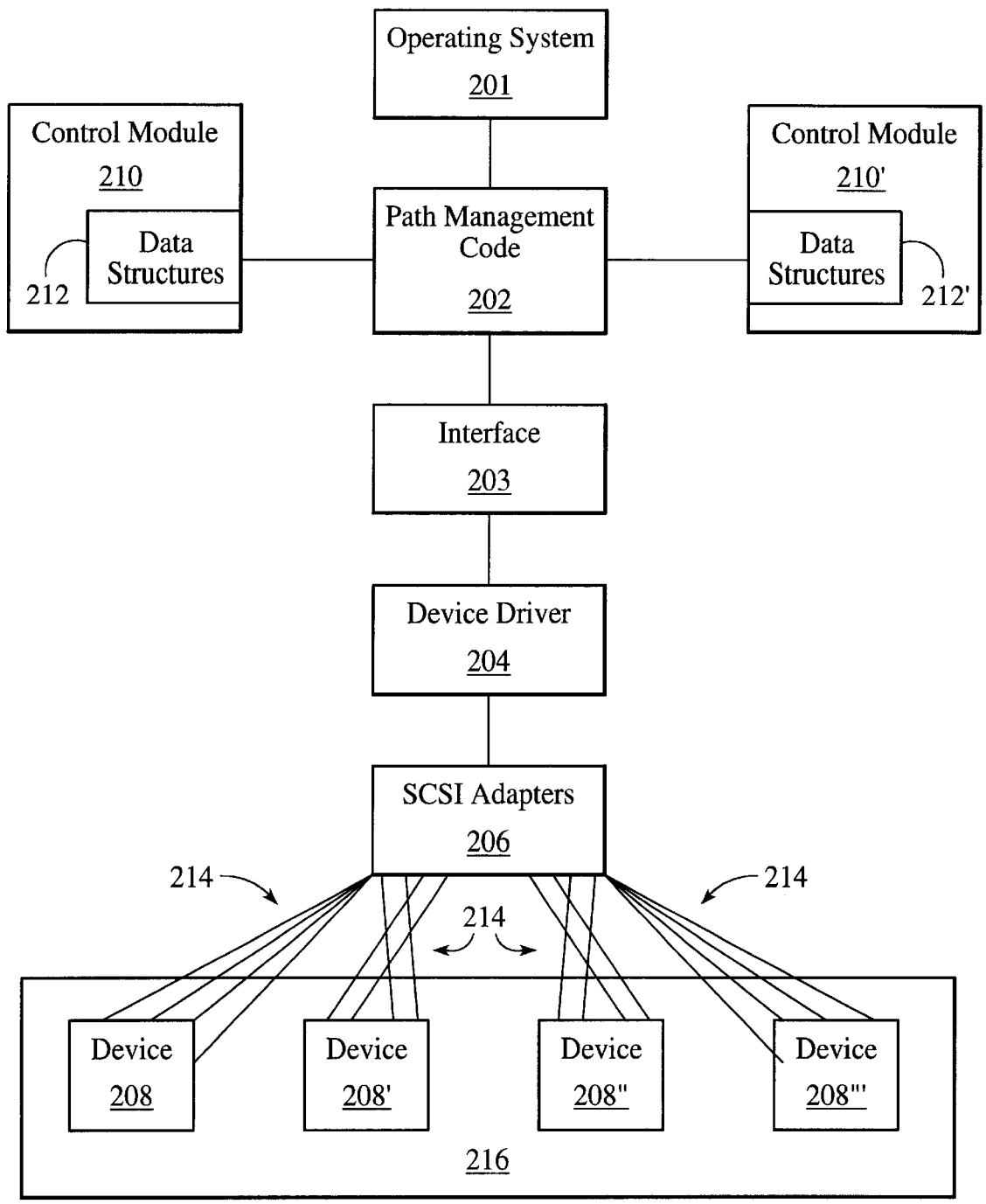
FIG. 3 is a block diagram of a system for path management in accordance with present invention.

To more specifically understand the present invention, refer now to the following detailed discussion in conjunction with FIG. 3, which is a block diagram of a system in accordance with the present invention.

The system 200 includes a host operating system 201 specific to the platform of the system 200. The system 200 includes path management code 202, an interface 203, a device driver 204, SCSI adapters 206, data storage devices 208, 208', 208", 208"', control modules 210 and 210', data structures 212 and 212', and a plurality of paths 214. The path management code 202 operates as a software device driver that is platform independent. Thus, the path management code 202 can operate with any operating system. The virtual storage subsystem 216 is an array of data storage devices 208, 208', 208", and 208"' that can be accessed by the system 200. Each data storage device 208, 208', 208", 208"' can be accessed by a plurality of paths 214. Path management code 202 is platform independent and created in a manner such that all path control is done by common functions via calls to platform independent code. Control modules 210, 210' contain information about the system 200, some of which is specific to the platform of system 200. However, areas 212, 212' within the control modules 210, 210' contain certain platform independent information about the data storage devices 208, 208', 208", 208"'. These areas are designated as data structures 212, 212'. The path management code 202 uses these platform independent data structures 212, 212' that represent the state of the devices 208, 208', 208", 208"' and the SCSI adapters 206.

These data structures 212, 212' contain information about each data storage device 208, 208', 208", 208"' regarding their respective characteristics, identity, and path status. Path status information includes the number of paths connected to the device, the number of paths still in operation for the device, and the last path used for an I/O to the device. The data structures 212, 212' also include the identity of the devices 208, 208', 208", 208"', the unit serial number of the devices 208, 208', 208", 208"', the status of the devices 208, 208', 208", 208"' (e.g. open or closed) and a spin lock for each device 208, 208', 208", 208"'. The path management code 202 uses these data structures 212, 212' to select and manage the paths 214 for the devices 208, 208', 208", 208"'. However, in a preferred embodiment, the path management code 202 does not create the data structures 212, 212'.

When an application on the operating system 201 makes an I/O request for data from the virtual storage subsystem 216, the path management code 202 is called to control access to the plurality of paths 214 to the virtual storage subsystem 216. The path management code 202 includes a load balancing algorithm and a path fail over algorithm which are platform independent. The load balancing algorithm evenly distributes the I/O requests while maintaining a record of which paths 214 have been used and which SCSI adapters 206 the paths 214 are attached to. By utilizing a method in accordance with the present invention, data will not be lost when a particular path 214 fails. When a path 214 to a particular device 208, 208', 208", 208"' fails, the path management code 202 will use the path fail algorithm to try the remaining paths until a successful connection is made. If all paths 214 to a device 208, 208', 208", 208"' fail, the path management code 202 will recognize this as a device problem.

Thus, the path management code 202 can perform path selection and management functions. Because the path management code is platform independent, the path management code can be ported to other systems (not shown) having different operating systems (not shown). This path management can be accomplished on different platforms without specifically tailoring the path management code 202 to a specific operating system. Such an arrangement would increase the total amount of data available, maximize data access and increase overall system performance while simplifying development.

Figure 4:
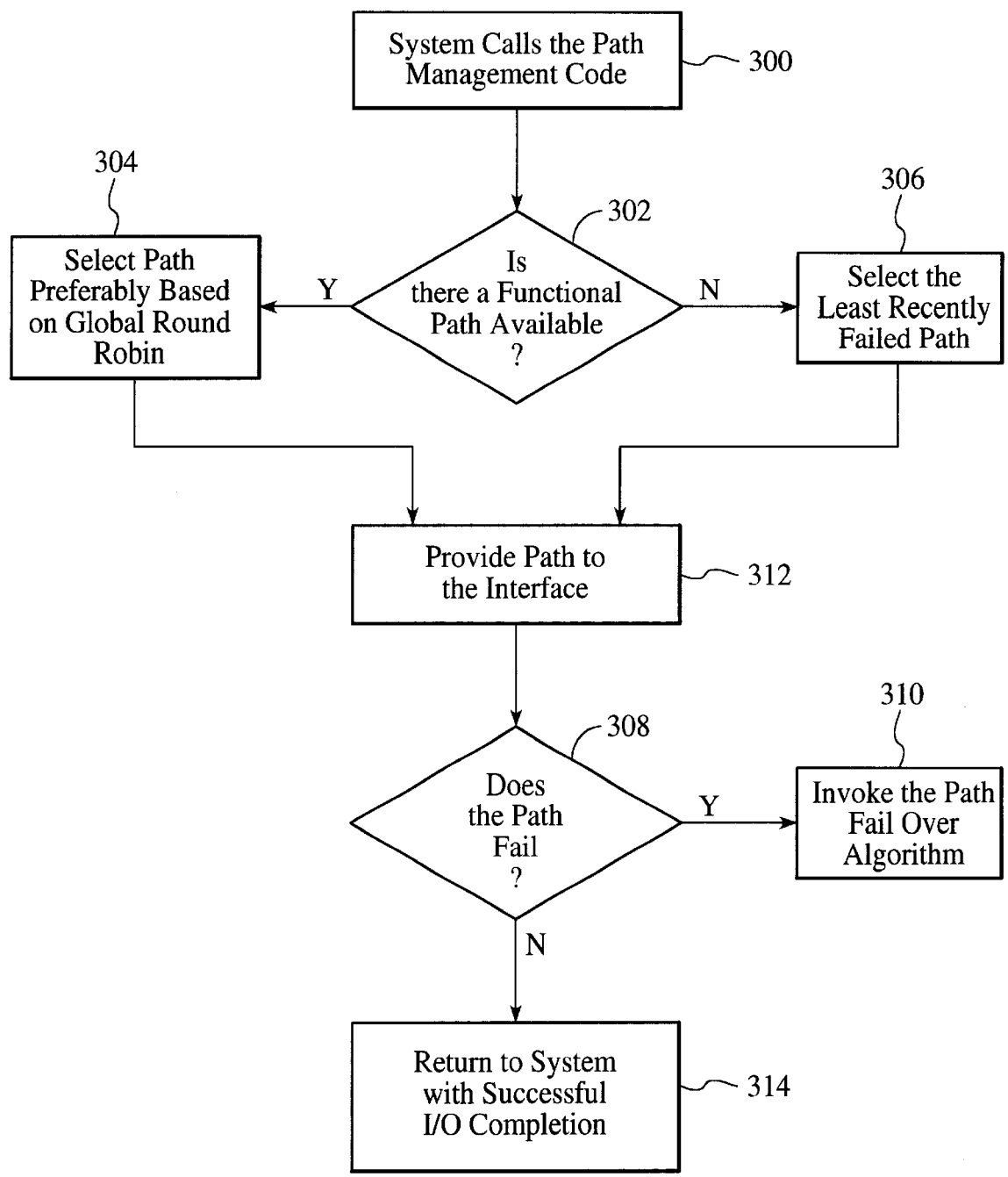
FIG. 4 is a flowchart of the system and method in accordance with the present invention.

To further describe the operation of a system in accordance with the present invention, refer now to FIG. 4. FIG. 4 is a high-level flowchart of a method in accordance with the present invention. Any time the system 200 is to start a data transfer, it will call the path management code 202, via step 300 to determine which path to use for the transfer. The path management code 202 then determines whether there is a functional path available, via step 302. A functional path is a path upon which there have been no unsuccessful attempts to service I/O requests, as discussed below. If there is a functional path available, a functional path is selected, via step 304. In a preferred embodiment, step 304 includes selecting the path on a round robin basis. If a functional path is not available, the least recently failed path is selected, via step 306.

The path is then provided to the interface 203, via step 312. It is then determined if the path failed, via step 308. If the path does not fail, a successful I/O completion is returned to the system 20, via step 314. If it is determined that the path fails in step 308 the path fail over algorithm is invoked, via step 310. The path fail over algorithm, as discussed below, accounts for failed paths and ensures that data is not lost due to a failed path.

Path Selection Algorithm

Figure 5:
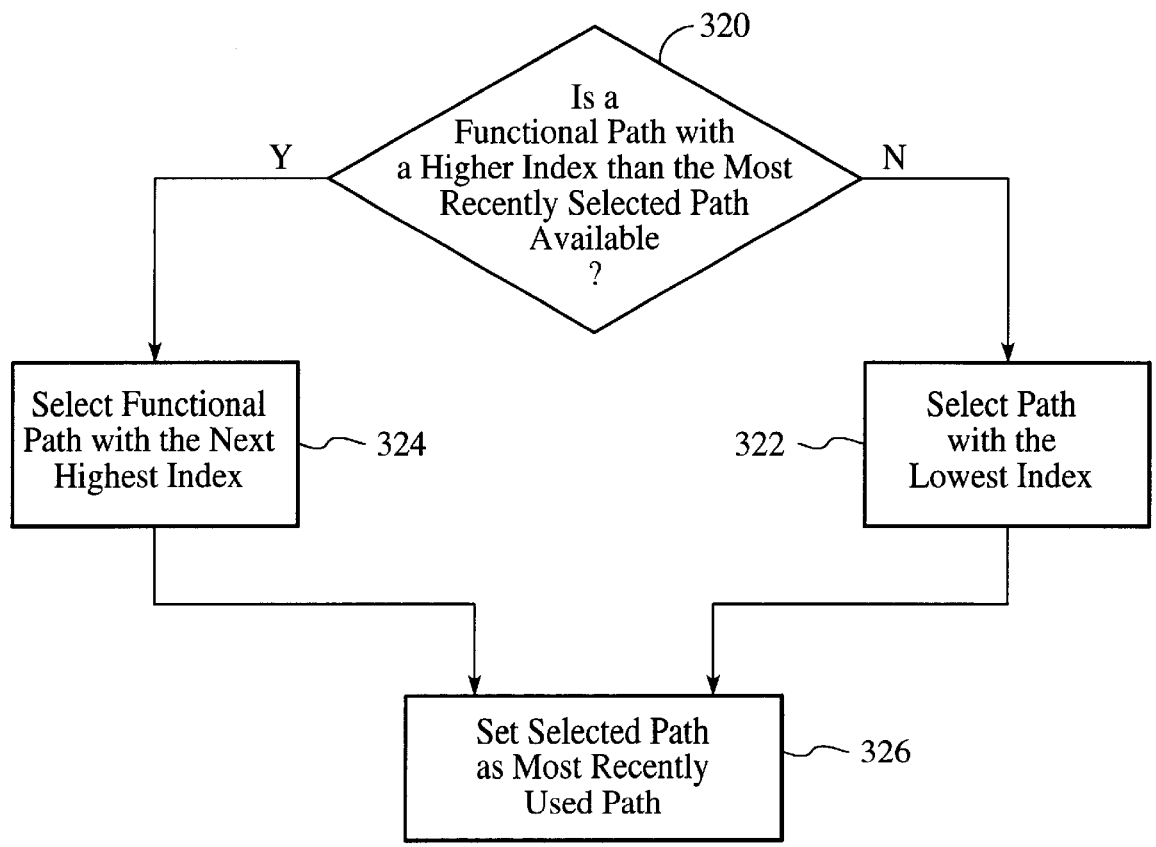
FIG. 5 is a flowchart of the path selection algorithm.

FIG. 5 depicts a flowchart of the algorithm that is preferably used to select a path in step 304. Each SCSI adapter 206 has an associated adapter index. This adapter index is used to select the path. Once the path management code 202 determines that a functional path is available, the path selection algorithm determines whether this functional path has a higher index than the most recently selected path, via step 320. If there is a functional path available with a higher index than a most recently selected path, the path selection algorithm selects the functional path with the next highest index, via step 324. The first time that a path is selected, the path having the lowest adapter index is selected in step 324. If there is not a functional path available with a higher index than the most recently selected path, the path selection algorithm selects the functional path with the lowest index, via step 322.

The path selection algorithm then sets the selected path as the most recently used path, via step 326. In the preferred embodiment, a table is maintained for each SCSI adapter 206 attached to the system 200. In the preferred embodiment, the table lists the paths based on the adapter index from a lowest to a highest adapter index. Typically, a cursor is utilized to indicate the most recently selected path. In such an embodiment, step 320 includes determining if there is a path with a lower index on the table than the cursor is indicating. If so, then the path that is lower on the table is selected in step 324. Otherwise, the path at the top of the table is selected in step 322. The cursor is then moved to the selected path in step 326. Thus, path selection is performed on a global round-robin basis and is done in such a way as to evenly distribute I/O requests over the attachment buses being used for the virtual subsystem 216.

Path Fail Over Algorithm

Figure 6:
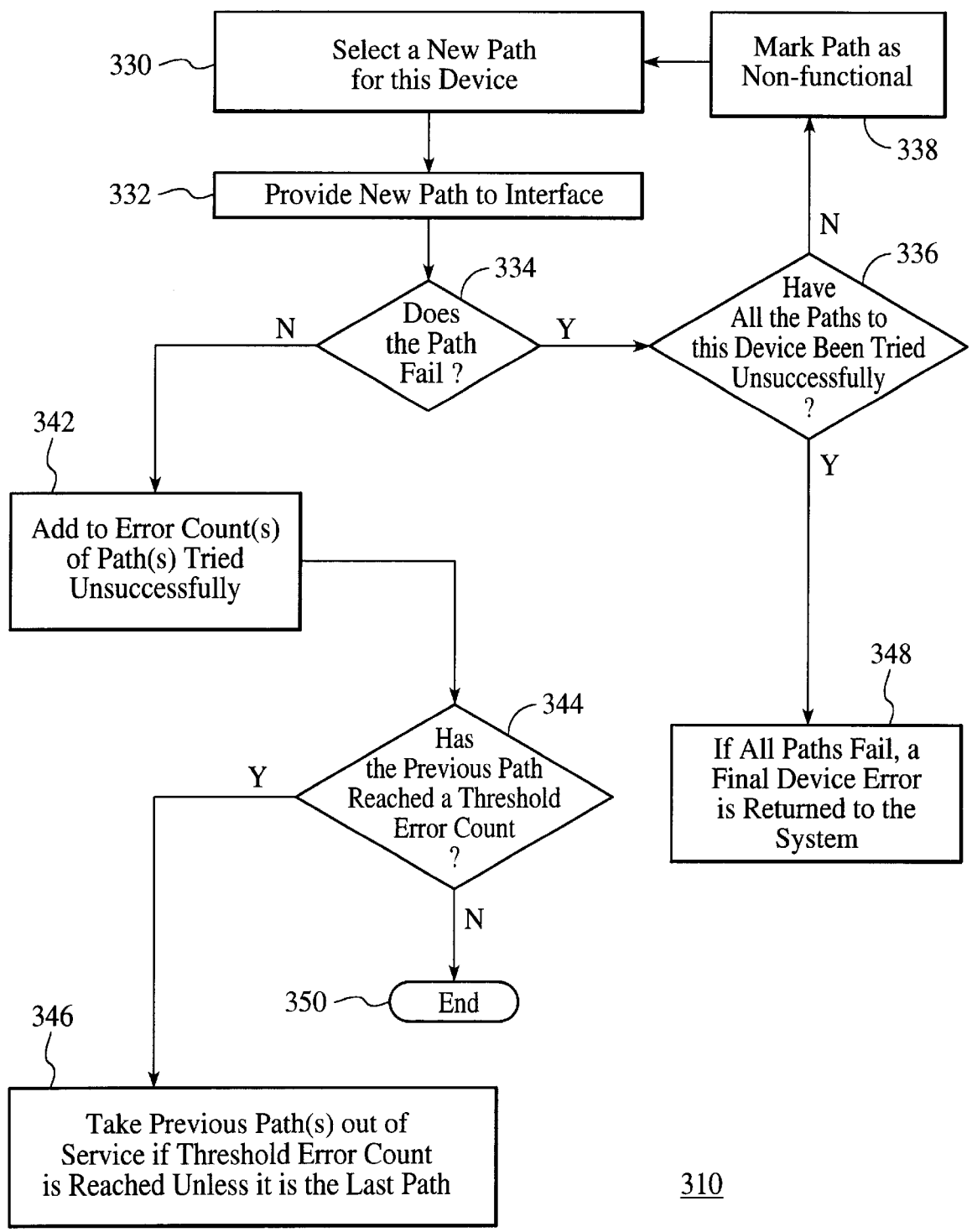
FIG. 6 is a flowchart of the path fail over algorithm.

FIG. 6 is a flowchart of the path fail over algorithm. If an I/O request fails on a selected path, the path fail over algorithm will be invoked in step 310 of FIG. 4. Referring to FIG. 6, the path management code 202 will call the path selection algorithm used in step 304 to select a new path to the same device, via step 330. The new path is then provided to the interface 203, via step 332. It is determined if the selected path fails, via step 334. If this path fails, the path management code 202 will determine whether all the paths to the device have been tried unsuccessfully, via step 336. If all paths to the device have failed, a final device error is returned to the system 200, via step 348.

If all the paths haven't been tried unsuccessfully, the path will be marked as non-functional, via step 338. A non-functional path is a path upon which an unsuccessful I/O request has been attempted. The path fail algorithm keeps track of all errors (unsuccessful attempts) recorded on each path. All paths that are functional will be selection candidates for a new path. Those that have already experienced errors are considered non-functional and will only be selected for retries on a periodic basis. A non-functional path will not be a candidate for selection for some number of tries for the device 208, 208', 208'', or 208'''. The path management code 202 will call the selection algorithm used in step 304 to select a new path, via step 330. Retries will be attempted on all possible paths to the device via steps 330, 332, 334, 336, and 338 until an I/O request is successful or until no further path exists.

If it is determined the path does not fail in step 334, the paths that were tried unsuccessfully and marked as non-functional in step 338 will have an error added to their error count, via step 342. The error count tracks the number of times that a path has been tried unsuccessfully. It is then determined if the path(s) tried unsuccessfully have reached a threshold error count, via step 344. If the error count for a path reaches a threshold, the path will be taken out of service, unless it is the last path left to the device, via step 346. The last path to a device will never be removed from service. If the error count has not reached a threshold for a path, the path fail over algorithm 310 ends, via step 350.

Although the present invention has been described in the context of a preferred embodiment, one of ordinary skill in the art will readily recognize that there could be variations to the embodiment and those variations would be within the spirit and scope of the present invention. For example, in a Windows NT environment, the method in accordance with the present invention can be provided as a filter driver that will filter requests to NT disk device driver. In an AIX environment, the method in accordance with the present invention can be a pseudo driver that filters requests to the AIX disk device driver. It should also be well understood by one of ordinary skill in the art that although the above example has been shown with one operating system platform, the system 200 can exist in a network where there are any number of such systems. Accordingly, many modifications may be made by one of ordinary skill in the art without departing from the spirit and scope of the appended claims.

What is claimed is:

1. A method for path management of a data processing system which can include a plurality of hosts; the plurality of hosts running multiple operating systems, the method comprising the steps of:

(a) providing a portable path management code;

(b) providing a plurality of control modules, each of the control modules having an area which can only be accessed by the portable path management code; and (c) providing an interface to at least one device driver from the portable management code to allow the portable management code to control access to the plurality of paths to a plurality of storage subsystems by the at least one device driver.

2. The method of claim 1, wherein the portable path management code providing step (a) further includes the step of:

(a1) providing a platform independent portable path management code.

3. The method of claim 1 wherein the portable path management code controls access to the plurality of paths by selecting a path of the plurality of paths on a global round robin basis.

4. The method of claim 3 wherein the portable path management code further controls access to the plurality of paths by selecting a new path of the plurality of paths if the path fails.

5. A system for path management in a host including at least one device, at least one device driver for controlling the at least one device, and a plurality of paths between the at least one device and the at least one device driver, the system comprising:

a portable management code for managing the plurality of paths;

at least one control structure having at least one data structure accessible to the portable management code, the at least one data structure including information about the plurality of paths and the at least one device; and at least one interface to the at least one device driver from the portable management code, the at least one interface allowing the portable management code to control access to plurality of paths to the at least one device by the at least one device driver.

6. The system of claim 5 wherein the portable management code is platform independent.

7. The system of claim 5 wherein the at least one interface is platform specific.

8. The system of claim 5 wherein the portable management code further selects a path of the plurality of paths for providing input to or output from the at least one device.

9. The system of claim 8 wherein the portable management code further selects a new path of the plurality of paths when the path fails.

10. A computer-readable medium containing a program for servicing a request for at least one device, a plurality of paths being coupled to the at least one device, the program including instructions for:

(a) selecting a path of the plurality of paths; and (b) providing the selected path to an interface, the interface for communicating with a device driver for servicing the request;

wherein the program is portable.

11. The computer-readable medium of claim 10 wherein the instruction for selecting the path further includes instructions for:

(a1) selecting the path on a global round robin basis.

12. The computer-readable medium of claim 10 wherein the program further includes instructions for:

(c) accounting for a failure of the selected path.

13. The computer-readable medium of claim 12 wherein the instruction for accounting for a failure of the selected path further includes instructions for:

(c1) selecting a new path of the plurality of paths; and (c2) providing the new path to the interface.

\* \* \* \* \*